United States Patent [19]

Stevens

[11] Patent Number: 5,493,072
[45] Date of Patent: Feb. 20, 1996

[54] HIGH VOLTAGE CABLE TERMINATION

[75] Inventor: David R. Stevens, Andover, N.J.

[73] Assignee: Amerace Corporation, Hackettstown, N.J.

[21] Appl. No.: 260,301

[22] Filed: Jun. 15, 1994

[51] Int. Cl.⁶ .................................................. H01B 17/28
[52] U.S. Cl. .................... 174/143; 174/19; 174/73.1; 174/141 R
[58] Field of Search ................. 174/143, 140 R, 174/141 R, 144, 19, 73.1, 80, 152 R, 31 R, 137 B

[56] References Cited

U.S. PATENT DOCUMENTS

| | | | |
|---|---|---|---|
| 2,794,063 | 7/1957 | Nicholas | 174/143 |
| 3,197,551 | 7/1965 | Linderholm | 174/73.1 |
| 3,479,443 | 11/1969 | Mashikian et al. | 174/73.1 |
| 3,538,241 | 11/1970 | Rein | 174/143 |
| 3,673,305 | 6/1972 | Mashikian et al. | 174/12 BH |
| 3,735,019 | 5/1973 | Hess et al. | 174/31 R |
| 3,861,135 | 1/1975 | Seeger, Jr. et al. | 174/88 R X |
| 3,976,055 | 8/1976 | Monter et al. | 128/643 |
| 4,179,582 | 12/1979 | Garcia | 174/15.3 |
| 4,227,035 | 10/1980 | Runnels et al. | 174/15.3 |
| 4,228,318 | 10/1980 | Selsing | 174/73.1 |
| 4,418,240 | 11/1983 | Chazelas | 174/73.1 |
| 4,497,975 | 2/1985 | Selsing | 174/19 |
| 4,622,611 | 11/1986 | Bennett et al. | 361/433 |
| 5,093,762 | 3/1992 | Sato et al. | 361/502 |

FOREIGN PATENT DOCUMENTS 5274941  10/1993  Japan ..................................... 174/143

Primary Examiner—Kristine L. Kincaid
Assistant Examiner—Paramita Ghosh
Attorney, Agent, or Firm—David Teschner

[57] ABSTRACT

A series connected capacitive graded high voltage cable terminator and suspension insulator made up of a number of individual modules each made by molding an insulating material between and around two flat, parallel plates molded of conductive material. The modules are connected in series by stacking them and the cable shield is introduced at one end while the bare conductor emerges from the stack cap. The electrical stress is uniformly divided by the number of capacitors in the series. The stack can also be used to suspend a bare high voltage conductor from a grounded tower.

30 Claims, 4 Drawing Sheets

HIGH VOLTAGE CABLE TERMINATION

BACKGROUND OF THE INVENTION

1. Field of the Invention

The invention is directed to the field of terminating high voltage electrical cables and providing suspension insulators for bare high voltage distribution electrical cables and more particularly to providing electrical stress control for such cables.

2. Description of the Prior Art

The concept of using series connected capacitors to uniformly control electrical stress on a cable termination is well known and some patents found describe their approach as modular because they employ a stacked group of similar components or subassemblies.

U.S. Pat. No. 2,794,063 issued May 28, 1957, to J. H. Nicholas, uses a series of modules each having a flange 42 which is the dielectric for the plates which are the metal coating 46 and 46' on the faces of flanges 42. The capacitance of each module depends upon the thickness of flange 42. Individual modules are connected by garter springs 56.

U.S. Pat. No. 3,197,551 issued Jul. 27, 1965 to S. O. Linderholm, uses a voltage divider of the condenser type for distributing electrical stress. The voltage divider consists of a series of annular capacitor elements 23 to 34 stacked within the insulator housing 13. Each of the capacitor elements 23 to 34 comprises interleaved layers of metallic foil 36 and 37 separated by insulating layers 38, all wrapped around an insulating tube.

Mashikian et al, U.S. Pat. No. 3,479,443 issued Nov. 18, 1969, uses an annular insulator body 18 having tightly packed therein a multiplicity of flat alternately conducting 20 and insulating rings 22. A stress cone 30 connects the metal ring at one end to the conducting sheath 12 on the cable and a metal cap 44 connects the conducting rings 20 to the bared conductor 10.

Rein, U.S. Pat. No. 3,538,241 issued Nov. 3, 1970 uses spaced electrode layers or strips 11 on tape 10 placed on insulated carrier tube 8 to form series connected capacitors connected at one end to conductor 1.

Mashikian et al, U.S. Pat. No. 3,673,305 issued Jun. 27, 1972, surrounds flexible insulating sleeve 38 with a number of modules, each comprising series connected capacitors formed by conducting rings 40 separated by electrically insulating rings 42 formed of a material having a high dielectric constant.

U.S. Pat. No. 3,793,477 issued Feb. 19, 1974 to Wagenaar describes an electrical bushing having condenser elements formed of two or more conducting layers. A gap between conducting layers of one condenser element is completely surrounded by one of the conducting layers of the next adjacent condenser element or the gaps in condenser elements located on the same side of the displaced gap condenser elements are substantially aligned with each other. With either arrangement the points of equal potential stress are substantially uniform. Also see U.S. Pat. No. 4,227,035 issued Oct. 7, 1980 to Wagenaar, et al.

U.S. Pat. No. 4,179,582 issued Dec. 18, 1979 to Garcia includes internal and external grading capacitor stacks which form a closed dielectric filled chamber to provide a uniform voltage distribution between the various interfaces.

SUMMARY OF THE INVENTION

The instant invention overcomes the difficulties note above the respect to prior art capacitive coupled stress grading devices by providing a module which can be stacked and by such stacking interconnected to form a stress grading device which can be used as a high voltage cable terminator or a suspension insulator for high voltage distribution cables.

Each module has the external shape of a rain shed and a central cylindrical bore therethrough. Two conductive elastomeric layers are formed as a confronting, parallel flat plate capacitor separated by a layer of insulating elastomeric acting as the dielectric between the capacitor plates and additional elastomeric to act as the insulation and main body of the module. The conductive elastomeric is continued from each of the two plates to the wall of the central bore whereby each module can be connected to its adjacent modules placing the individual capacitors in series along the terminator and to engage the insulation layer of the high voltage cable to provide shielding. The modules each have an annular recess at a first end and an annular ridge at the other to permit interlocking assembly of the modules. A cap member is placed at one or both ends of the stacked modules to allow the high voltage central conductor to exit the terminator or allow for clamps to enter the suspension insulator. Such a cap also contains a conductive elastomeric layer to couple the capacitor plates to the cable conductor. It is an object of this invention to provide a module having a flat plate capacitor therein which can be stacked to provide a series connected capacitive stress grading cable terminator and suspension insulator for high voltage cables.

It is still another object of this invention to provide a molded module which contains a parallel, flat plate capacitor, which can be placed in series with other capacitors by stacking the modules.

It is still another object of this invention to provide a molded module which contains a parallel, flat plate capacitor formed of molded conductive material separated and surrounded by a molded insulating material.

Other objects and features of the invention will be pointed out in the following description and claims and illustrated in the accompanying drawings, which disclose, by way of example, the principles of the invention, and the best modes which are presently contemplated for carrying them out.

BRIEF DESCRIPTION OF THE DRAWINGS

In the drawings in which similar elements are given similar reference characters.

DESCRIPTION OF THE PREFERRED EMBODIMENTS

Figure 1:
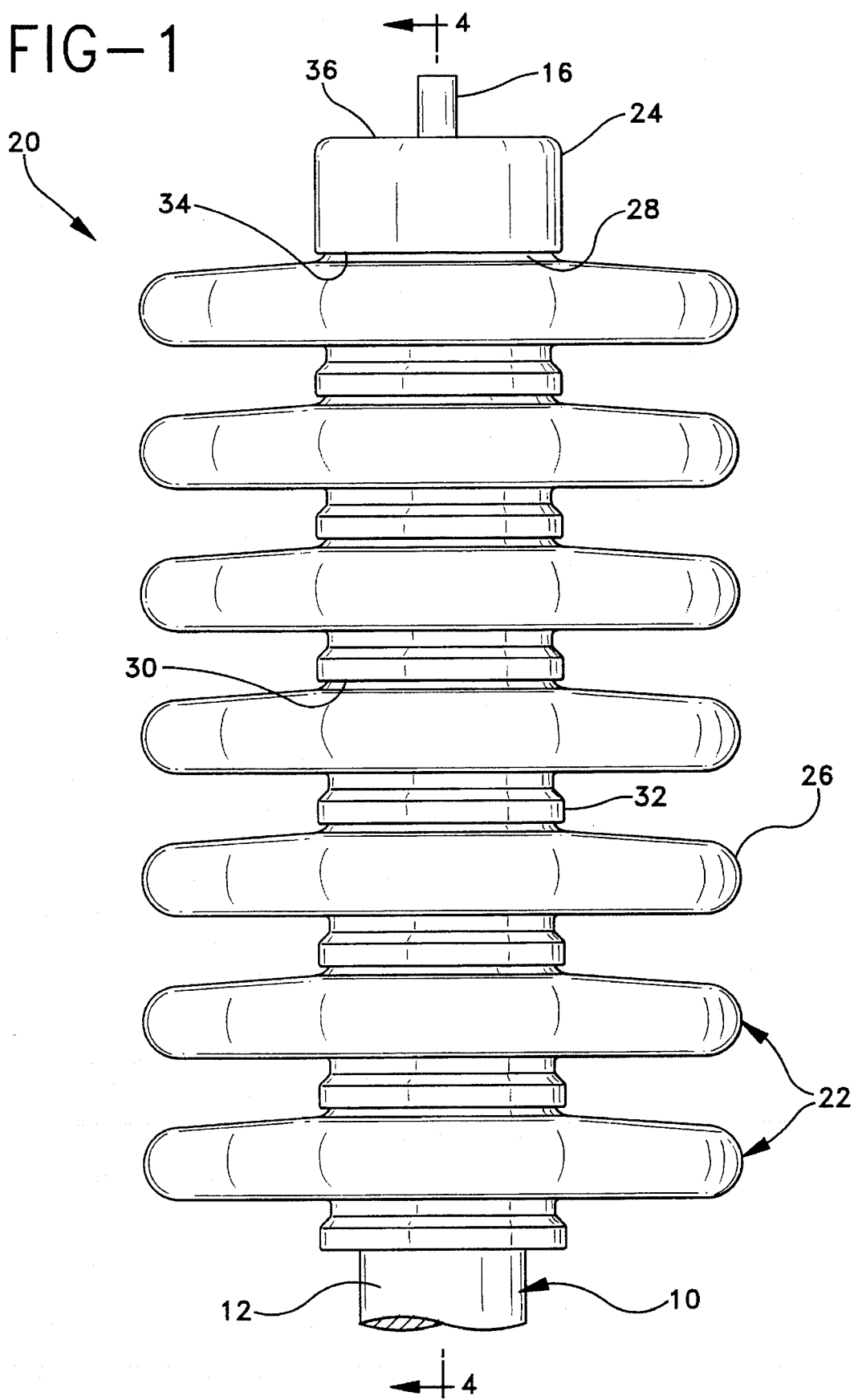
FIG. 1 is a front elevational view of a high voltage cable termination constructed in accordance with the concepts of the invention.
Figure 2:
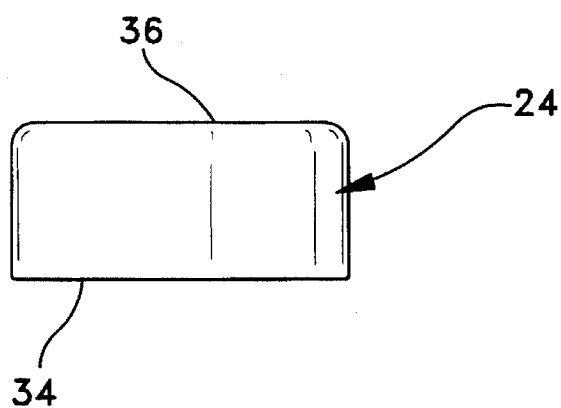
FIG. 2 is a front elevational view of the cap of the device of FIG. 1.
Figure 3:
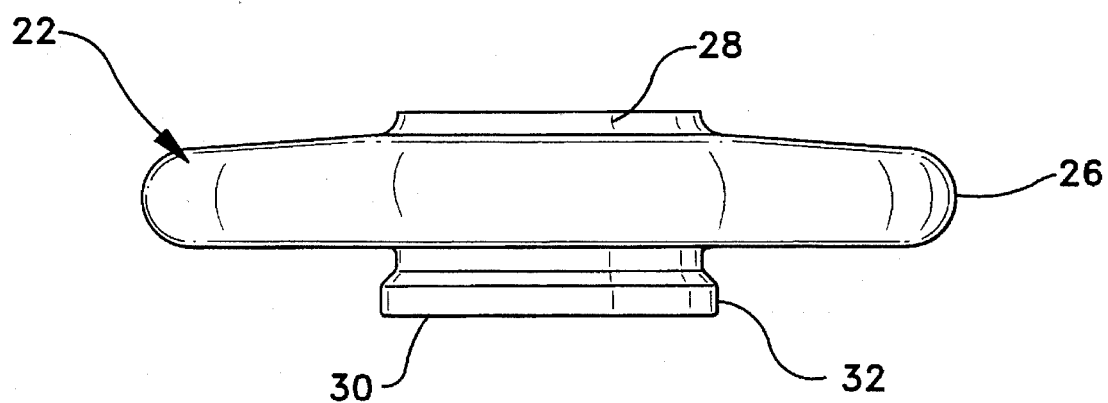
FIG. 3 is a front elevational view of a module of the device of FIG. 1.
Figure 4:
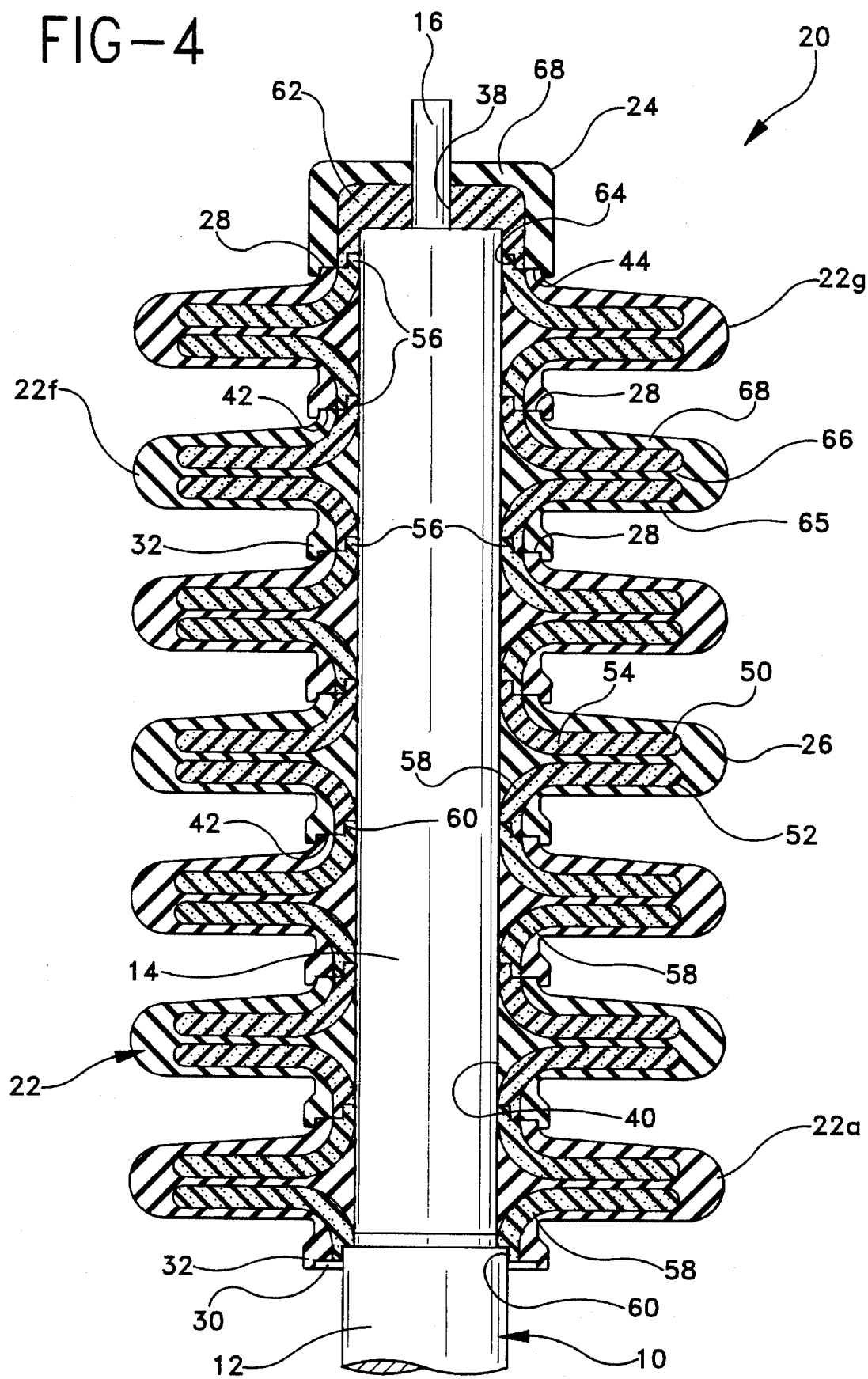
FIG. 4 is a side elevational view, in section, taken along the lines 4—4 in FIG. 1.

Turning now to FIGS. 1,2 and 4, there is shown a high voltage electrical cable terminator 20 constructed in accordance with the concepts of the invention. A high voltage cable 10 has a portion of its shield 12 removed to expose insulation layer 14. A portion of the insulation layer 14 is removed to expose the central metal conductor 16. Terminator 20 is made up of a number of stackable modules 22 and completed at its top end with a cap 24.

As is well known in the high voltage field, the outer cable shield 12 is maintained at ground potential while the central conductor 16 may be at 15 KV, 25 KV, 35 KV, etc. depending upon the system. Effectively the shield 12 must be separated from central conductor 16 in such a manner that the voltage gradient from shield 12 to conductor 16 is below that which can cause an arc to be created between them or cause the insulation to be degraded to permit tracing along the insulation between them. One of the techniques previously employed required a stress cone to be built up by use of conductive and insulating tape layers or the use of a premolded stress cone which could be slipped over the cable end. The tape method was time consuming and the presence of pinholes in the tape could destroy the stress core and cables in time. The premolded stress cores took a great deal of space. Some stress grading materials can be employed to avoid large premolded stress cones but their operation was not reliable. The capacitively graded stress control device promised the best approach, but as shown above with respect to the devices of the prior art, they were large, complex and difficult to manufacture and use.

The instant device provides individual modules each of which contains a flat, parallel plate capacitor of a value which can be determined by the size of the individual plates and the dielectric strength of the insulation between the capacitor plates. By stacking the modules, which places the capacitors in series, the total capacitance can be increased to the desired value. If more capacitance is needed, more modules are stacked, if less, fewer modules are used. By making the modules have the same individual capacitance, the voltage differential between shield 12 and conductor 16 can be equally divided among each of the capacitors. The voltage of each module will be $$V_M = V_T/M_n$$

where $V_M$=the Voltage supported by each module $V_T$=the total voltage difference between shield and central conductor $M_n$=number of stacked modules Each of the modules 22 is the same and thus there is no particular order in which they must be stacked. The external shape of the modules 22 provides a rain shed as at 26. The top edge 28 is arranged to fit within the skirt 32 adjacent bottom edge 30. Cap 24 has a bottom skirt 34 which fits over top edge 28 of module 22 and a substantially closed top end 36 with an aperture 38 therein to accept the metallic central conductor 16 of cable 10 therethrough. A central bore 40 extends through each module 22 and into the cap 24 for a short distance where it joins aperture 38.

Turning to FIG. 4, the top edge 28 of module 22f fits within skirt 32 of module 22g and rests against an internal edge 42. The edge 28 of module 22g fits within skirt 34 of cap 24 and engages internal edge 44 of cap 24.

The capacitor of each module 22 is composed of an upper plate 50 and a lower plate 52 which are each flat and positioned parallel with one another throughout most of their width. A curved lead 54 connects one end of plate 50 and becomes a portion of the wall of central bore 40 and connects to the lower plate 52 of the next higher module 22. An annular rib 56 extends from lead 54 above edge 28. A second curved lead 58 connects one end of plate 52 and becomes a portion of the wall of the central bore 40 and connects to the upper plate 50 of the next lower module 22.

An annular recess 60 in internal edge 42, receives the annular rib 56 to electrically join upper plate 50 of module 22f in series with lower plate 52 of module 22g. The annular recess 60 of module 22a receives the edge of the shield 12 of cable 10. The remainder of the curved lead 58 which is part of the wall of bore 40 engages the cable insulation 14 to control the stress of any air trapped between the terminator 20 and the cable 10.

Cap 24 has a portion 62 adjacent central bore 40 and has an annular recess 64 extending inwardly from internal edge 44 to receive therein the annular rib 56 of module 22g.

The capacitor plates 50, 52, the curved leads 54, 58 and portion 62 are all molded of a conductive material such as natural or synthetic rubber, silicone rubber, elastomeric, EPDM or the like to which carbon black has been added to make the material conductive. The material 66 between plates 50, 52 and the material 68 around portion 62 is molded of an insulating material such as natural or synthetic rubber, silicon rubber, elastomeric, EPDM or the like. A terminator 20 according to the instant invention may have modules which have an external diameter of 14.5 inches, a height between edges 28 and 30 of 3.625 inches, a gap between capacitor plates 50, 62 of 0.025 inches and a total stack height 26.0 inches.

As shown in FIG. 4, with all modules 22 in place, with cap 24 on module 22g and the cable 10 inserted as shown, all the capacitors made up of the plates 50, 52 of the individual modules are connected in series between the shield 12 of high voltage cable 10 and the central conductor 16 as it exits cap 24 and forms a shield layer for the exposed insulation layer 14 of cable 10. Assuming the shield 12 to be a ground potential and the conductor 16 to be at 15 KV, the voltage supported by each module 22 will be 15 KV/7=2141 volts.

Figure 5:
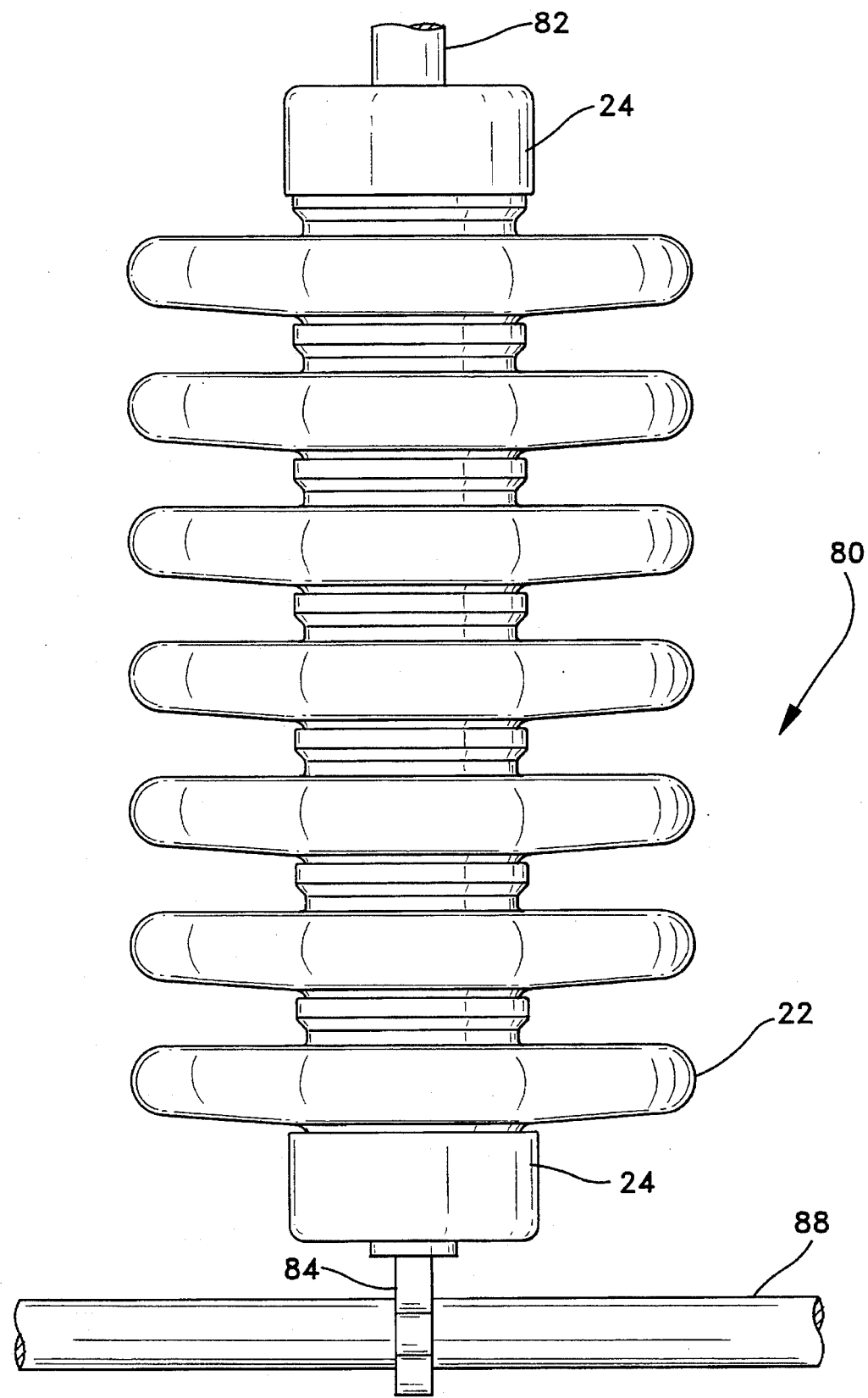
FIG. 5 is a front elevational view of a suspension insulator for a high voltage electrical distribution cable constructed in accordance with the concepts of the invention.

A suspension insulator 80 can also be provided for a bare high voltage cable supported from a utility tower. As shown in FIG. 5, a stack of modules 22 can be joined as in FIG. 1 but caps 24 would be placed at each end. A metal bar 82 would connect the suspension insulator 80 to the metal utility tower (not shown). A metal bar 84 would connect the conductive layers in the modules 22 to the bare high voltage conductor 88. An insulating rod (not shown) in the modules' center bore 40 would keep the modules 22 in assembly. Thus the suspension insulator 80 would provide capacitive grading between the utility tower at ground potential and the conductor 88 at the distribution voltage.

While there have been shown and described and pointed out the fundamental novel features of the invention as applied to the preferred embodiment, it will be understood that various omissions and substitutions and changes of the form and details of the device illustrated and in their operation may be made by those skilled in the art, without departing from the spirit of the invention.

I claim:

1. A molded capacitor module comprising:

a) a first plate having a first surface and molded of a conductive material;

b) a second plate having a second surface said first surface and molded of said conductive material, said second surface of said second plate parallel with and spaced apart from said first surface of said first plate;

c) a uniform insulating material molded between the full extent of said first and second surfaces and around said first plate and said second plate;

d) first contact means molded of said conductive material coupled to said first plate; and e) second contact means molded of said conductive material coupled to said second plate whereby said molded capacitor module can be placed in circuit with other electrical members.

2. A molded module as defined in claim 1, wherein said first and said second plates are molded of conductive natural rubber and said insulating material is natural rubber.

3. A molded module as defined in claim 1, wherein said first and second plates are molded of conductive synthetic rubber and said insulating material is synthetic rubber.

4. A molded module as defined in claim 1, wherein said first and second plates are molded of conductive elastomeric and said insulating material is elastomeric.

5. A molded module as defined in claim 1, wherein said first and second plates are molded of conductive EPDM material and said insulating material is EPDM.

6. A molded module as defined in claim 1, wherein said first and second plates are molded of conductive EPDM material and said insulating material is silicon rubber.

7. A molded module as defined in claim 1, wherein
   a) said first plate and said first contact means are a unitary structure molded from conductive elastomeric; and
   b) said second plate and said second contact means are a unitary structure molded from conductive elastomeric.

8. A molded module as defined in claim 7, wherein said insulating material is insulating elastomeric.

9. A molded module as defined in claim 7, wherein said insulating material is insulating silicon rubber.

10. A molded module as defined in claim 1, wherein said first and second plates are flat.

11. A molded module as defined in claim 1, wherein said first and second plates are round.

12. A molded module as defined in claim 1, wherein said first and second plate are flat and round.

13. A molded module as defined in claim 1, further comprising:
   a) a bore extending through said module; and
   b) each of said first and second contact means extending to said bore whereby said first and second plates can be coupled to electrical members inserted into said bore.

14. A molded module as defined in claim 13, wherein said first and said second contact means form a part of a wall defining said bore.

15. Stackable molded capacitor modules which permit the series connection of the capacitor of each module in the stack, at least two modules stacked one on the other, each module comprising:
   a) a first plate having a first surface and molded of a conductive material;
   b) a second plate having a second surface facing said first surface and molded of said conductive material, parallel with and spaced apart from said first plate;
   c) a uniform insulating material molded between the full extent of said first and second surfaces and around said first plate and said second plate;
   d) first contact means molded of said conductive material coupled to said first plate; and
   e) second contact means molded of said conductive material coupled to said second plate, whereby when a second of said at least two modules is stacked upon a first of said at least two modules, said second contact means of said first of said at least two module engages said first contact means of said second of said at least two modules to place the capacitor of said second of said at least two modules in series with the capacitor of said first of said at least two modules.

16. Stackable molded capacitor modules as defined in claim 15, wherein said first and said second plates are molded of conductive natural rubber and said insulating material is natural rubber.

17. Stackable molded capacitor modules as defined in claim 15, wherein said first and second plates are molded of conductive synthetic rubber and said insulating material is synthetic rubber.

18. Stackable molded capacitor modules as defined in claim 15, wherein said first and second plates are molded of conductive elastomeric and said insulating material is elastomeric.

19. Stackable molded capacitor modules as defined in claim 15, wherein said first and second plates are molded of conductive EPDM material and said insulating material is EPDM.

20. Stackable molded capacitor modules as defined in claim 15, wherein said first and second plates are molded of conductive EPDM material and said insulating material is silicon rubber.

21. Stackable molded capacitor modules as defined in claim 15 wherein
   a) said first plate and said first contact means are a unitary structure molded from conductive elastomeric; and
   b) said second plate and said second contact means are a unitary structure molded from conductive elastomeric.

22. Stackable molded capacitor modules as defined in claim 21, wherein said insulating material is insulating elastomeric.

23. Stackable molded capacitor modules as defined in claim 21, wherein said insulating material is insulating silicon rubber.

24. Stackable molded capacitor modules as defined in claim 15, wherein said first and second plates are flat.

25. Stackable molded capacitor modules as defined in claim 15, wherein said first and second plates are round.

26. Stackable molded capacitor modules as defined in claim 15, wherein said first and second plates are flat and round.

27. A high voltage cable terminator fabricated of at least two stackable molded capacitor modules which permit the series connection of the capacitor of each module in the stack, said at least two modules stacked one on top of the other, each of said modules comprising:
   a) a first plate having a first surface and molded of a conductive material;
   b) a second plate having a second surface facing said first surface and molded of said conductive material, parallel with and spaced apart from said first plate;
   c) a uniform insulating material molded between the full extent of said first and second surfaces and around said first plate and said second plate;
   d) first contact means molded of said conductive material coupled to said first plate;
   e) a second contact means of said conductive material coupled to said second plate, whereby when a second of said at least two modules is stacked upon a first of said at least two modules, said second contact means of said first of said at least two modules coupled to said first contact means of said second of said at least two modules to place the capacitor of said second of said at least two modules in series with the capacitor of said first of said at least two modules;
   f) cap means having an outer portion molded of insulating material and an inner portion molded of said conductive material; said inner portion having a recess to accept a portion of said second module of said at least two modules and make contact with said second module of said at least two modules;

g) an aperture in said cap means extending through said inner conductive portion and said outer insulating portion;

h) a central bore through said at least two modules; and i) means connecting said second contact means of said first of said at least two modules to a portion of said central bore whereby when a high voltage cable having a shield and a bared central conductor is inserted in said central bore with said shield of said high voltage cable brought into contact with said means and said bared central conductor of said high voltage cable is placed in said aperture in said cap means the capacitors of the stacked modules are connected in series between said cable shield and said cable central conductor.

28. A high voltage cable terminator as defined in claim 27, wherein said means connecting said second contact means of said first of said at least two modules to a portion of said central bore is a molded extension of said second contact means which forms a part of a wall defining said central bore.

29. A high voltage cable terminator as defined in claim 27, wherein each of said first and second contact means has a molded extension which forms a part of a wall defining said central bore whereby an exposed section of insulation of said high voltage cable inserted in said central bore will be in contact with said extensions of both of said at least two modules to provide a shield for the exposed insulation of said high voltage cable.

30. A suspension insulator fabricated of at least two stackable molded capacitor modules which permit the series connection of the capacitor of each module in the stack, said at least two modules stacked one on the other, each of said modules comprising:

a) a first plate having a first surface and molded of a conductive material;

b) a second plate having a second surface facing said first surface and molded of said conductive material, parallel with and spaced apart from said first plate;

c) a uniform insulating material molded between the full extent of said first and second surfaces and around said first plate and said second plate;

d) a first contact means of said conductive material coupled to said first plate;

e) a second contact means of said conductive material coupled to said second plate, whereby when a second of said at least two modules is stacked upon a first of said at least two modules, said second contact means of said first of said at least two modules engages said first contact means of said second of said at least two modules to place the capacitor of said second of said at least two modules in series with the capacitor of said first of said at least two modules;

f) first cap means having an outer portion molded of insulating material and an inner portion molded of said conductive material, said inner portion having a recess to accept a portion of said second module of said at least two modules and make contact with said first contact means of said second modules of said at least two modules;

g) a first aperture in said first cap means extending through said inner conductive portion and said outer insulating portion;

h) a central bore through said at least two modules;

i) a second cap means molded from insulating material to fit over said first of said at least two modules to seal the end of said central bore at said first of said at least two modules;

j) a second aperture in said second cap means; and k) means connecting said second contact means of said first of said at least two modules to a portion of said central bore whereby when a first metal hanger connecting said suspension insulator to a metal utility tower is inserted through said second aperture said metal hanger is brought into contact with said connecting means a a second metal hanger extending through said first aperture in said first cap and in contact with the inner conducting portion of said first cap and a bare high voltage conductor the capacitors of the stacked modules are connected in series between said tower first hanger and said bare conductor second hanger.

\* \* \* \* \*

UNITED STATES PATENT AND TRADEMARK OFFICE
CERTIFICATE OF CORRECTION

PATENT NO. : 5,493,072

DATED : February 20, 1996

INVENTOR(S) : Stevens

It is certified that error appears in the above-identified patent and that said Letters Patent is hereby corrected as shown below:

Column 1, line 66, "note" should read --noted--;
    line 67, "the" should read --with--.
Column 3, line 12, "tracing" should read --tracking--;
    line 18, "core" should read --cone--;
    line 19, "cores" should read --cone--.
Column 4, line 22, "62" should read --52--;
    line 30, "a" should read --at--.
    line 56, "surface said" should read --surface facing said--.
Column 8, line 17, (claim 30) "modules" should read --module--;
    line 35, (claim 30) "a a" should read --and a--.

Signed and Sealed this

Twenty-fifth Day of June, 1996

*Attest:*

BRUCE LEHMAN

*Attesting Officer*    *Commissioner of Patents and Trademarks*